United States Patent [19]

Sostero

[11] 3,827,698

[45] Aug. 6, 1974

[54] RECORD SEQUENTIALLY POSITIONING DEVICE FOR AUTOMATIC PHONOGRAPH RECORD PLAYERS

[76] Inventor: Carlo Sostero, c/o Seimart S.p.A. 10 Via Bistagno, Torino, Italy 10136

[22] Filed: Sept. 17, 1973

[21] Appl. No.: 397,791

[30] Foreign Application Priority Data

Sept. 15, 1972 Italy .................................. 29267/72

[52] U.S. Cl. .................................................. 274/10 S

[51] Int. Cl. .............................................. G11b 17/04

[58] Field of Search ..................................... 274/10 S

[56] References Cited

UNITED STATES PATENTS

| | | | |
|---|---|---|---|
| 3,103,363 | 9/1963 | Churchill | 274/10 S |
| 3,181,871 | 5/1965 | Goulding | 274/10 S |
| 3,400,935 | 9/1968 | Kolomayets et al. | 274/10 S |

*Primary Examiner*—Harry N. Haroian

*Attorney, Agent, or Firm*—Michael S. Striker

[57] ABSTRACT

The specification describes a device for supporting phonograph records on the step of a long turntable spindle of an automatic record player, and for sequentially causing individual records to fall on said turntable for playing. The device comprise a long oscillatable arm located within said spindle, having an upper notched tip adapted to shifting the lowermost record in a stack located on said step, and desengaging it from said step, and a lower end portion cooperatively engaged in a control lever cooperating with the record layer program selection lever for phasedly oscillating said arm. The device is complemented with a separate body, designed for slidably fit on the upper portion of the spindle, over the record stack and designed for maintaining said stack horizontal and for latching said notched tip in its oscillated position when the last record of the stack has been caused to fall, for modifying the record player program. An ancillary member for adapting the device to manipulate large holed 45 r.p.m. records.

5 Claims, 10 Drawing Figures

RECORD SEQUENTIALLY POSITIONING DEVICE FOR AUTOMATIC PHONOGRAPH RECORD PLAYERS

BACKGROUND OF THE INVENTION

1. The Field of the Invention

This invention is generally related with record players of the "automatic" type, that is of the type designed for automatically sequentially playing different disc type phonograph records accomodated upon the upper portion of a long turntable spindle and sequentially caused to fall on the turntable. More particularly this invention is concerned with a new, simple but efficient spindle and spindle control mechanism for such phonograph record players. Still more particularly, this invention is concerned with a stepped long spindle which can be readily interchanged with a short spindle for conventional individual records playing, and which can be readily adapted for accomodating and cooperatively operating different types of records, such as the 78 r.p.m., 33 ⅓ r.p.m. and 16.6 r.p.m. records having "standard" small diameter (7.14 millimeters, or 0.281 inch) center hole, and 45 r.p.m. records having a larger diameter (38 millimeters or 1.5 inch) center hole.

2. The Prior Art

This art is a well worked one and a wide variety such phonograph record players are commercially manufactured and, therefore, an extensive comment and discussion thereof is unnecessary. Most common devices comprise a long turntable spindle having a step formed at its upper portion for supporting a pile of records to be played, at a vertical interval above turntable for free motion and return of the tone-arm and pick-up head, even if a pile of records is also seated on said turntable. In general, a stationary up-right structure, located at one side of the turntable, is provided for engaging a small portion of the edge on the lowermost record of the thus supported pile, for maintaining such pile horizontal. Sensing means adapted for signalling the fall of the last remaining record from the step are also provided and most commonly arranged in said structure, this signalling causing the controls of the record player to set so that the record player operation will be automatically discontinued upon having played the last fallen record. The said structure and the devices and mechanisms cooperatively associated therewith provide a source of disturbance in handling the records (in particular when the record player has been provided with a short spindle), are costly and undesirably intricate.

It is therefore an object of this invention to provide a new improved mechanism which is not subject to the above and other objections and drawbacks of the known structures and mechanisms, and wherein the several function of horizontally supporting a pile of record, of causing the individual records to sequentially fall on the turntable for being played, and of signalling the fall of the last record, are performed by means integrally formed with or cooperatively associated to the spindle, said means including an arrangement by which such spindle can be readily substituted by a short one, concurrently discontinuing the automatic repeating of the playing, and a ancillary equipment for adapting the spindle for supporting and operating records having a large center hole. Other objects and advantages of the invention will be made apparent to those skilled in art as this description proceeds.

SUMMARY OF THE INVENTION

Substantially, the device of the invention comprises a long spindle removably fitted into a turntable tubular bearing and having a pile of record supporting step in its upper portion. A long flat arm is oscillatably and longitudinally arranged into a longitudinal diametral groove formed in said spindle. The upper end portion of said arm projects a little above said step and promotes, upon oscillation of the arm, the desengagement of the lowermost record from the step and it is notched for being at its turn engaged by a separate component slidably fitted for vertical movement about said upper portion, when the last record of the pile has fallen. Said separate component consists of a rather heavy and thick disk centrally bored for fitting about the said spindle upper portion and has a flat lower face which as abutting on the uppermost record of the pile maintain said pile horizontal on said step. The lower end of said arm downwardly projects below the said tubular bearing for cooperative engagement with a horizontally swingable lever actuated by the conventional mechanisms of the automatic record player for phasedly causing the desengagement of the lowermost record from the step of the spindle and its fall on the turnable for playing, said lever being associated with spring means positioned for upwardly biasing said oscillatable arm and causing the upper end portion thereof to engage the said separate component when no more records remain in said step and thus latching said arm in a position in which said conventional mechanisms are set for causing the record player to stop when the last fallen record has been played.

Further, there is provided an ancillary equipment consisting of an essentially flat member of thicknes greater than the long spindle diameter and less than the large (38 millimeters) center hole of 45 r.p.m. records, longitudinally bored for fitting about said spindle. Said member has a stepped upper portion sidewardly shifted relatively to said bore and so positioned and dimensioned that a pile of 45 r.p.m. records positioned about said spindle and stepped upper portion will engage the spindle step and be supported thereby, a lower portion so positioned and dimensioned that a 45 r.p.m. record fallen and seated on the turntable will be centered on said turntable for playing, and a middle portion having parallel slanting side edges so dimensioned and positioned that a falling 45 r.p.m. record, desengaged from the spindle step, will downwardly slide along and about said member and be guided from said sidewardly shifted position to said centered position, the said separate rather heavy component being further so dimensioned that it can be also made use of for horizontally maintaining also the said 45 r.p.m. record or piled records on the said spindle step and ancillary member before their sequential desengagement from said step and fall on said turntable.

The said ancillary member can be simply removed from the said long spindle if records having standard small diameter center hole are to be played. The said disk-shaped separate component has preferably a diameter slightly less than 38 millimeters for taking advantage of said component as a certering disc which can be readily located about either the said long spindle or a substitutive short spindle, if the playing 45 r.p.m. records one-by-one is desired.

These and other objects, features and advantages of the invention will be made apparent from the following detailed description of a preferred embodiment of same invention, taken together with the accompanying drawings, wherein only the combination and arrangement of parts, components and devices of interest for the invention have been illustrated, the remaining of the record player and several purely structural details having been omitted, for simplicity, as appertaining to current art.

THE VIEWS OF THE DRAWINGS

Figures 1, 2, 3:
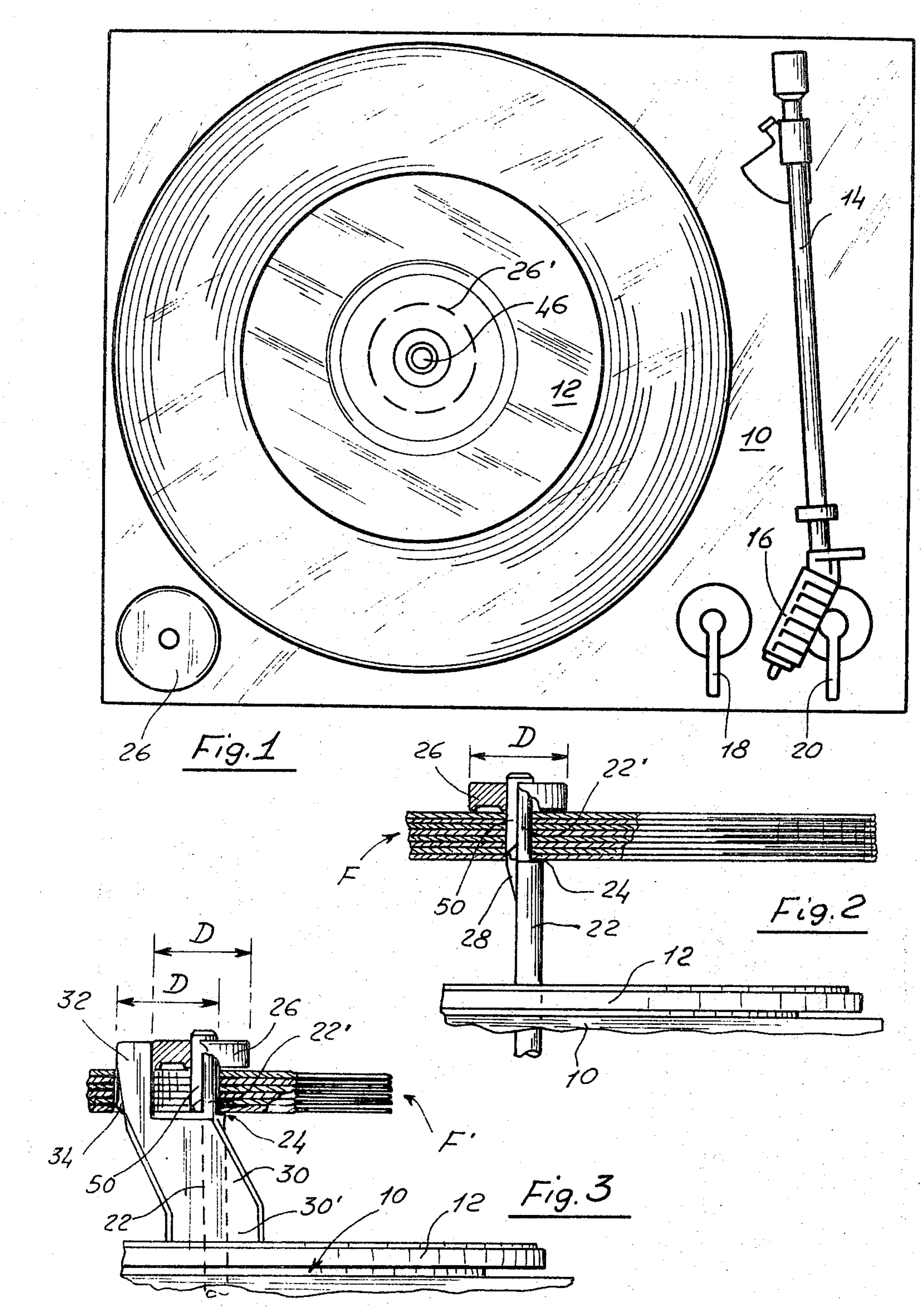
FIG. 1 is a diagrammatical view, taken from above, of an automatic record player which can be advantageously provided with a device constructed and operatable according to the principles of the invention.
FIGS. 2 and 3 are fragmentary partly lateral views and partly vertical sectional views of a pile or stack of standard center holed and respectively of 45 r.p.m. records stored on the step of the long spindle of a record player apparatus provided with the device of the invention.

Referring now particularly to the drawings:

As shown in FIGS. 1 to 3, the improved device is associated with and forms part of a phonograph record player including an upper planar base plate 10, forming a component of the structure of the record player, a conventional turntable 12, a swingable tone-arm 14 which support the pick-up head 16, and suitable handle means, such as control knobs or levers 18 and 20 for starting, stopping, automatic or not automatic cycle selection and so on, as well known in the art.

For automatic operation, including sequential playing of several records, the record player is provided with a long turntable spindle generally indicated at 22, having a record supporting step 24 and an extension 22′ above said step for centering a pile or stack F of records on said step. Above said stack F a separate component 26 is manually positioned. Such component is bored at 94 (FIG. 5) for co-axially and slidably fitting about said extension 22′ and of such diameter and weight for maintaining horizontal the said stack F of records (or the one record remaining) on the step 24. Said component 26 is of diameter slightly less than 38 millimeters, so that it can be made use of as "adaptator" about a short spindle (not shown), when located where indicated at 26′ in FIG. 1, for one-by-one playing of 45 r.p.m. records. When not in use, the component 26 can be accomodated into a suitable seat provided in the base plate 10, such as examplified in FIG. 1.

FIG. 2 illustrates a stack F of records having standard center hole as positioned on the step 24 of the long spindle and stabilized by the separate component 26 positioned thereabove. In FIG. 3 there is shown as the device can be readily adapted for sequential playing of 45 r.p.m. records, having center holes of 38 millimeters diameter, located on same step 24 of the long spindle, which is in this occurrence complemented by an ancillary member 30. Such member has a slanting middle portion along which the individually falling 45 r.p.m. records can guidedly slide to attain a proper position on the turntable 12, co-axially centered thereon by the lower portion 30′ of same member.

At its upper portion, said ancillary member 30 has an upward extension 32 integrally formed. Such extension 32 is located to form, together with the extension 22′ of the long spindle 22, two vertical guide means which slidably engage at diametrally opposite locations the edges of the center holes of the 45 r.p.m. records in the stack F′. A suitable oscillatable pawl 34 cooperates for proper positioning of 45 r.p.m. records above the lowermost one in the stack F′. In this occurrence, also, the separate component 26 is manually positioned above the stack F′ for horizontally levelling the records and for performing other particular functions, as described below. The operation of the device, as described below, is not modified whether the member 30 is made use of or not.

For better understanding of the features and advantages of the new device, a few basic features of the automatic record players are to be taken into consideration. Such apparatuses comprise a mechanism which commonly includes one or more cams and which programs the positioning and return motions of tone-arm and triggers, at the proper time, the fall of a new record to be played on the turntable. By acting a suitable control knob or lever (such as one of knobs 18 or 20), the operator can selectively set the mechanism either for (*i*) automatic stopping of the record player, upon completition of a record playing and return motion of the tune-arm, or for (ii) automatically repeating the playing of records as said records sequentially fall on the turntable.

Such automatic record players comprise also a sensing device to sense the fall of the last record of the stack, and means for promoting, upon sensing such fall, that is that the record to be played is the last one, the switching of the mechanism from setting for "program (ii)" to setting for "program (i)". The selection of the program is made by manually or automatically swinging a horizontal lever appertaining to the known mechanism. Except for minor details, the various manufactured mechanisms are similar, and one of such levers is fragmentarily shown and indicated at 40 in FIGS. 8, 9 and 10, in its portion cooperatively associated to the new device.

Such lever consists of a flat shaped member, swingably supported about a stationary pivot pin and biased in direction E (FIG. 8) by a spring 44. Such lever 40 can be selectively set in either of two positions, indicated by alignments A′—A′ and respectively B′—B′ in FIGS. 9 and 10 and respectively in FIG. 8, for setting the automatic record player for operating according to program (i) and respectively to program (ii). The leverages and other components of such well known mechanism have not been shown except where essential for clear understanding of the device of the invention.

Figures 4, 5:
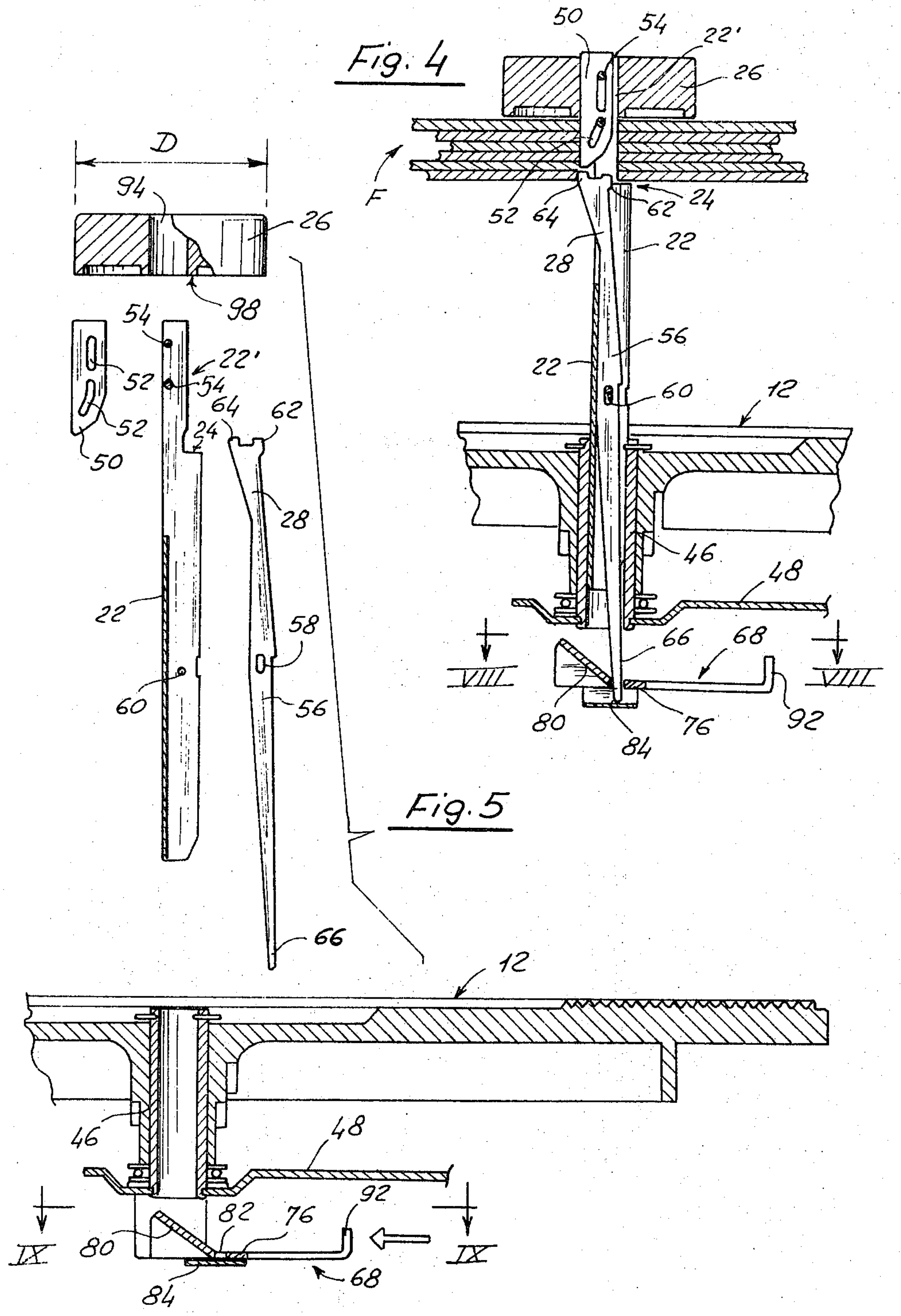
FIG. 4 is a fragmentary sectional view which illustrates in greater detail the device arranged as shown in FIG. 2.
FIG. 5 is an exploded view of the components of the device of FIG. 4.
Figure 6:
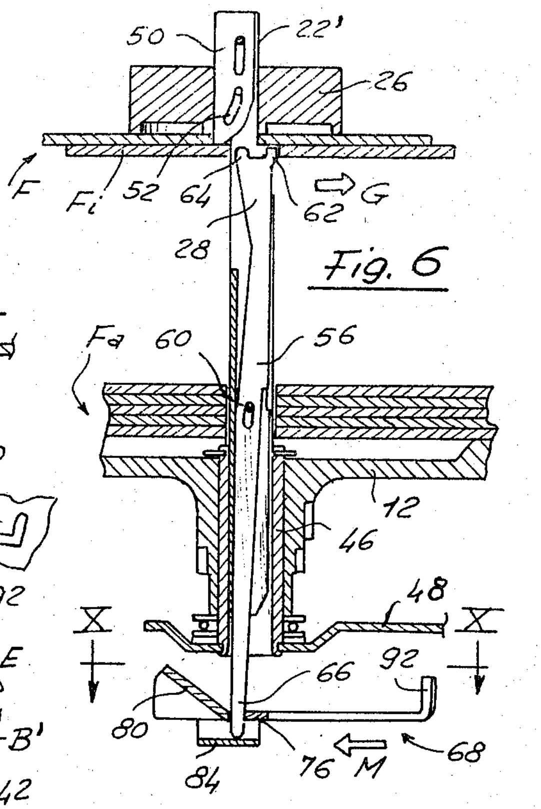
FIG. 6 is a view similar to that of FIG. 4 and illustrates the same device while the lowermost record of the stack is being desengaged from the step of the long spindle.

As shown in FIGS. 4 and 6, the long spindle 22 is removably fitted into a tubular bushing 46 on which the turntable 12 is supported for rotation, said bushing 46 being secured to a plate 48 forming part of the stationary structure of the record player. The upper portion 22' of said long spindle is provided with a pawl 50 secured to the spindle by pins 54 engaging elongated slots 52 of the pawl, according to a known arrangement for maintaining the lowermost record on the step 24, while admitting the removal of records from the spindle.

The said spindle is longitudinally diametrally grooved for accomodating a long flat arm 56, having an upper portion 28 which cooperates with said step 24 for sustaining the stack of records on said step. Such arm has at about midway of its length a vertically elongated hole 58 (FIG. 5) wherein a pin 60 is engaged for oscillatably securing said lever in the groove of the spindle, the elongation of said hole 58 allowing also a small vertical motion of said arm within the spindle 22. Said arm has also at the tip of its upper portion 28 two short and spaced projections 62 and 64, which project above the step 24 at a level not greater than the thickness of commonly manufactured phonograph records. The tip of the arm 56, when moved in direction G (FIG. 6) upon oscillation of the same arm, engages the center hole of the lowermost record in the stack F (and similarly in the stack F', FIG. 3), for laterally shifting such record off from the step 24 and therefore causing its fall on the turntable.

The same arm 56 has a lower tapered portion 66 downwardly projecting below the tubular bearing 46, when the long spindle 22 is fitted thereinto, and which cooperatively engages a two-armed L-shaped control lever 68, oscillatably supported by a vertical pin 70, and biased in direction H by a spring 72 until abutment on a stationary stop member 74. One arm portion 76 of said control lever is located below said spindle and bearing and intersects the common axis thereof.

The said arm portion 76 has a pin 78 secured thereto and a slanting or inclined surface 80 where passing below the said spindle 22. A hole 82 within which the said lower end 66 of the arm 56 can be oscillatably engaged is located adjacent to the lower end of said slanting surface 80. An upwardly biasing weak flat spring 84 is secured below the said control lever arm portion (FIGS. 4 and 6) for upwardly urging the long arm 56 when its lower portion 66 is engaged into and downwardly projects below said hole 82.

Figure 7:
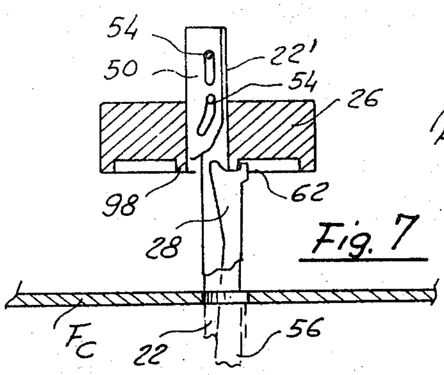
FIG. 7 is a fragmentary view of the device of FIGS. 4 and 6, upon the fall of the last record of the stack.
Figure 8:
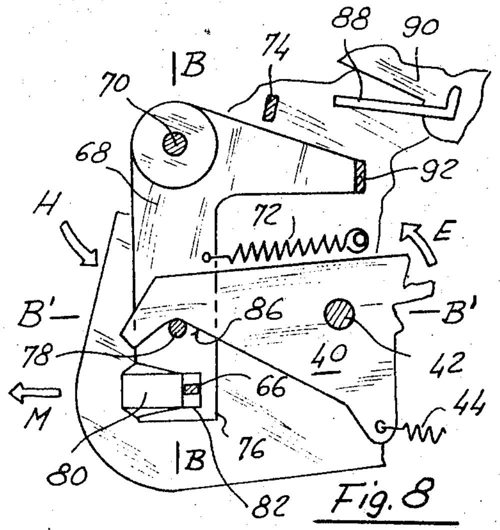
FIGS. 8, 9 and 10 are similar views of the swingable arm, in various operative positions, and of part of the associated mechanisms of the record player, as seen from the planes indicated at VIII—VIII and respectively IX—IX and X—X in FIG. 4 and respectively in FIGS. 5 and 6.

The program selection lever 40 (FIGS. 8 to 10) comprises a shaped recess 86 having converging edge flanks positioned for alternative abutment with the said pin 78, when said lever is set according to its alignment A'—A' (FIGS. 9 and 10), corresponding to setting for "program (i)" (automatic stopping of the record player when the playing of the record being played has been completed). When the said selection lever 40 is on the contrary set at its alignment B'—B' for "program (ii)" (repeating cycle) the said pin is caused to set at the deepest location of recess 86 (FIG. 8). This latter location of pin 78 defines therefore one position (indicated by alignment B—B in FIG. 8) of the two-armed lever 68, while the position of the selection lever 40 in its alignment A'—A' is compatible with two positions of the control lever 68, indicated by alignments A—A (FIG. 9) and respectively C—C (FIG. 10), this latter position, or more properly the shifting of the control lever arm 76 in direction M (FIG. 6) causing the in direction G of the tip of the long arm 56 in the spindle and the desengagement of the lowermost record Fi in the stack F from the step of the spindle and its fall on the turntable. A falling record is fragmentarily indicated at Fc in FIG. 7.

This shifting in direction M of the arm 76 of the two-armed lever 68 is promoted (FIG. 10) by a suitably chosen component of the known automatic record player mechanisms, such as a suitable brace 88 secured on the shaped swingable plate 90 which follows the motion of the tune-arm and actuates the positioning and the return motion of same tune-arm. The said brace 88 is positioned to abut on an up-turned wing 92 integral with the said two-armed lever 68.

The separate component 26 is provided, at its lower face and about the lower outlet of its bore 94, with a ring-shaped projection 98 (FIGS. 5 and 7) dimensioned for engaging the tip of the arm 56, between the said projections 62, 64, when no record remains on the step 24 (FIG. 7), thus signalling that the last record of the stack has been caused to fall. The said arm 56 will therefore be latched in its position of FIG. 6, shifted in direction G, and concurrently the two-armed lever 68 will be latched in its position of FIG. 10, shifted in direction M. The selection lever 40 will at its turn remain in the direction defined by alignment A'—A' (FIG. 10) for "program (i)".

Therefore, when all records of the stack F (or F') had been fallen on the turntable, the record player will automatically be set for also automatically discontinuing it operation when the last fallen record has been played. Such set corresponds to that to be selected when the record player is to be operated with a conventional "short spindle" (not shown) fitted in substitution of the long spindle 22, that is when the user desires to place records one-by-one on the turntable. By simply removing the long spindle 22 off from the tubular bearing 46, the device sets the record player for "program (i)". As a matter of fact, the removal of the spindle and therefore of its arm 56 (the former position of the lower portion of such arm is indicated by trace 66' in FIG. 9) allows the spring 72 to swing the two-armed lever 68 in direction H until abutment of the pin 78 on the other flank of recess 86, to maintain the selection lever 40 in its alignment A'—A'.

Figure 9:
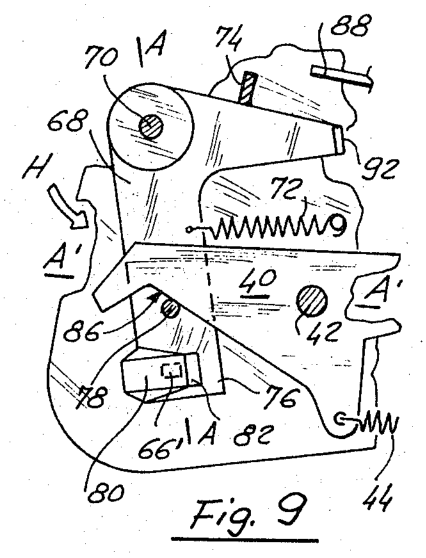
Figure 10:
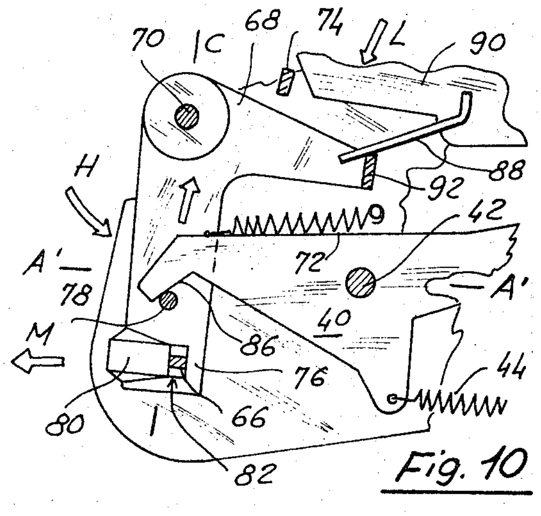

When the long spindle 22 is fitted again into the bearing 46, for preparing the record player for automatically repeated record playings, the lower portion 66 of its arm 56 abuts from above (in the position 66' of FIG. 9) on the slanting surface 80, which acts as a cam and causes the two-armed lever 68 to return from the position of FIG. 9 to the position of FIG. 8, thus re-setting the selection lever for program (ii), into alignment B'—B'. Such setting is temporarily only abandoned when the plate 90 (which follows the motion of the tune-arm) is moved in direction L (FIG. 10) and promotes the fall of another record by temporarily moving in direction M the arm 76 of control lever 68, until one record exists over the step 24. As above described, this setting on "program (i)" becames permanent when the last record has desengaged the step 24 and the ring-shaped projection 98 of the separate component 26 has latched the upper tip of the arm 56 in its position shifted in direction G. More particularly, from a comparison of FIGS. 6 and 7 it can be noted that the arm 56 occupies the same position. In FIG. 6, however, at least one record is positioned above the record Fi which is being disengaged from the step and caused to fall, and therefore the tip of said arm 56 can be returned in direction opposite to G (by the motion of the two-armed lever 68, promoted by return spring 72) for seating on the at least one remaining record on the step, for re-setting the mechanisms for "program (ii)". In FIG. 7. on the contrary, the absence of any record on the step allows the engagement and the latching of the arm 56 in said position, causing the setting for "program (i)" to became permanent.

I claim:

1. A device for sequentially and phasedly promoting the dropping and the positioning of phonograph records on the turntable of an automatic record player apparatus of the type comprising a long turntable spindle having at its upper portion a step for supporting a stack of records at a level above said turntable, and a mechanism including a selection lever swingable from one another of two positions at which the record player is set to automatically stop when the playing of one record has been completed ("program (i)") and respectively for automatic sequential playing of records ("program (ii)"), wherein the said long spindle has an elongated arm longitudinally and oscillatably supported thereinto, said arm having a notched upper tip projecting above the step and positioned for sliding off and desengaging from said step the lowermost record in said stack when oscillated in a given direction and a lower tip engaging a swingable control lever cooperatively associated to said selection lever, means for swinging said control lever in phase with the return motion of the tone-arm of the record player and oscillating said arm in said given direction, and concurrently causing said selection lever to set for "program (i)", spring return means for returning said levers and arm as a record of the stack has been caused to drop on the turntable, and a stack levelling separate component adapted for being vertically slidably fitted about said spindle above said stack and having a notched lower portion complementary to said notched upper tip of the said elongated arm to latch said arm as oscillated in said given direction in absence of any record on said step for maintaining said setting for "program (i)" when the last record of the stack has been dropped on the turntable.

2. The device of claim 1, comprising further an ancillary equipment consisting of a body bored for slidably fitting about said long spindle and including an upper portion positioned laterally of the upper portion of said spindle to form jointly with said portion a guide means for positioning a stack of 45 r.p.m. records having a 38 millimeters diameter center hole on said step, a lower portion symmetrical to said spindle for centering such records on the turntable, and a middle portion having parallel slanting side surfaces for guiding records desengaged from said step from an off-set position on said step to a centered position on said turntable.

3. The device of claim 1, wherein the said separate component consists of a relatively heavy flat cylindrical body centrally bored for slidably fitting about the upper portion of said spindle and having a ring-shaped downward projection about the lower outlet of the bore, said projection being complemental of the upper notched tip of said elongated lever when oscillated in said given direction.

4. The device of claim 1, wherein the said swingable control lever comprises an arm portion located below the said long spindle, a hole in said arm portion for oscillatable engagement of the lower end portion of said elongated arm, and an slanting surface adjacent to said hole, said surface being inclined for causing swinging of said lever when said lower end portion is downwardly urged on said surface until alignment with and engagement of said lower end portion in said hole.

5. The device of claim 4, wherein the said swingable control lever has a pin secured thereto in a position spaced from the pivotal axis of said lever, and the said selection lever has a recessed edge portion positioned to abut on said pin in either of three locations of the flanks of the recess to position said selection lever for "program (i)" when the abutment occurs at any of a first and of a third location and respectively for "program (ii)" when at the second location, wherein spring means are connected to selection lever for biasing same in abutment of its recess on said pin, wherein further spring means are connected to said control lever for biasing same towards a position in which said abutment occurs in said first location, wherein the engagement of said elongated arm with said control lever causes the same to occupy a second position in which said abutment occurs in said second location, and wherein a tone-arm controlled component has means to engage said control lever upon completion of the return motion of said tone-arm and to swing said control lever in a third position wherein said abutment occurs in said third location and the said elongated arm is oscillated for shifting a record off from the step and causing said record to drop on the turntable.

* * * * *